US009883663B1

(12) United States Patent
Hammon (10) Patent No.: US 9,883,663 B1
(45) Date of Patent: Feb. 6, 2018

(54) SELF-LOCKING SPRING METHOD FOR SNELLING SINGLE STRAND WIRE TO FISHING HOOKS (71) Applicant: Dominic Hammon, Brookings, OR (US)

(72) Inventor: Dominic Hammon, Brookings, OR (US)

(*) Notice: Subject to any disclaimer, the term of this patent is extended or adjusted under 35 U.S.C. 154(b) by 197 days.

(21) Appl. No.: 15/081,986

(22) Filed: Mar. 28, 2016

(51) Int. Cl.
*A01K 91/04* (2006.01)

(52) U.S. Cl.
CPC ..................... *A01K 91/04* (2013.01)

(58) Field of Classification Search
CPC .......................................... A01K 91/04
USPC ........... 140/80, 105, 149; 57/3, 311; 289/1.5
See application file for complete search history.

(56) References Cited

U.S. PATENT DOCUMENTS

| | | | |
|---|---|---|---|
| 2,700,840 A | 6/1953 | Butts | |
| 2,800,736 A * | 7/1957 | Beilharz | A01K 91/04 289/17 |
| 2,810,228 A * | 10/1957 | Braley | A01K 91/04 289/17 |
| 2,992,029 A | 7/1961 | Russell | |
| 3,434,750 A | 3/1969 | Hetrick | |
| 3,866,959 A * | 2/1975 | Matarelli | A01K 97/26 289/17 |
| 3,893,254 A | 7/1975 | Nack | |
| 4,008,913 A * | 2/1977 | Cole | A01K 97/26 289/17 |
| 4,660,314 A | 4/1987 | Janssen et al. | |
| 4,924,618 A * | 5/1990 | McGahee | A01K 85/02 24/600.9 |
| 5,593,198 A | 1/1997 | Vogel, II | |
| 5,603,181 A * | 2/1997 | Abdul-Raheem | A01K 91/04 24/131 R |
| 5,829,798 A | 11/1998 | Little | |
| 6,185,858 B1 | 2/2001 | Choron | |
| 6,634,680 B1 | 10/2003 | Firestone | |
| 6,681,514 B1 | 1/2004 | Jursik | |
| 6,862,838 B1 * | 3/2005 | Gibbs | A01K 91/14 43/42.74 |
| 7,666,196 B1 | 2/2010 | Miles | |
| 7,818,914 B1 * | 10/2010 | Baiamonte | A01K 97/18 43/53.5 |
| 8,511,721 B1 | 8/2013 | Farner et al. | |
| 9,538,735 B1 * | 1/2017 | Rider | A01K 83/00 |
| 9,717,225 B1 * | 8/2017 | Rider | A01K 91/04 |
| 2014/0208568 A1 * | 7/2014 | Johnson | A47G 7/047 29/428 |
| 2016/0106081 A1 * | 4/2016 | Thorne | A01K 85/18 43/42.39 |

* cited by examiner

*Primary Examiner* — Shaun R Hurley
(74) *Attorney, Agent, or Firm* — Jerry Haynes Law (57) ABSTRACT

A self-locking spring method for snelling single strand wire to fishing hooks by using common tools such as a needle nose pliers and a modified linesman pliers comprises clutching and bending with the needle nose pliers at a predetermined length from the distal end of the wire in a fashion to form a "key-like" shaped form of distal end portion of the wire, then inserting the distal end of the wire thru an eye of the hook, and then clutching a shank of the hook with the linesman pliers and finally turning the hook counter-clockwise relative to the linesman pliers, preferably up to seven rotations to create a wire snelled fishing hook.

12 Claims, 7 Drawing Sheets

SELF-LOCKING SPRING METHOD FOR SNELLING SINGLE STRAND WIRE TO FISHING HOOKS

FIELD OF THE INVENTION

The present invention relates generally to a method of snelling single strand wire to fishing hooks. More specifically it relates to a self-locking spring method for snelling single strand wire to fishing hooks.

BACKGROUND OF THE INVENTION

Numerous fishing tools have been provided in the prior art that are adapted to hold fish hooks so that fishing lines can be attached to them. Various knots are available to securely tie a fish hook and fisherman are generally skilled in the art of tying fish hooks to fishing line, but unfortunately, but very few fishermen know how to expertly tie such knots, or they are not skilled enough at quickly snelling the hook. Even the knot tying process can also be a time consuming process for even more experienced fishermen.

Many solutions have been developed to assist fisherman in this process. In some methods, snells have been attached to fish-hooks in several and various manners, for example, by threading a snell through the eye of a fish-hook and fastening the snell to the shank of the hook by means of whipping thread or the like. If this is to be done other than by hand, complicated machinery is required for simultaneously revolving and advancing a fish-hook as the whipping thread is applied thereto. Other methods include threading the snell through the eye of the hook and fastening the threaded end to the snell itself rather than to the shank of the hook. There is still a need for a more relatively easy, and preferably strong, means of tying a fish hook to a line.

Numerous innovations have been provided in prior art that are adapted to hold fish hooks so that fishing line can be attached to the fish hooks as described below. Even though these innovations may be suitable for the specific purposes to which they address, however, they would not be as suitable for the purposes of the present invention.

For example, U.S. Pat. No. 8,511,721 to Farner et al. discloses a knot tying implement comprising of an elongated rigid body consisting of a tubular shaft at the front of the implement, wherein the implement assists an angler in the tying and fabrication of fishing knots and to fishing knots which can be fabricated by the implement.

U.S. Pat. No. 7,666,196 to Miles discloses a specialized knot tying device comprising an inner rod with a longitudinal through-slot, a hollow cylinder with a longitudinal through-slot, and a cord winding cylinder with a longitudinal through-slot.

U.S. Pat. No. 6,185,858 to Choron describes a leader attachment tool that includes a bent wire member including a handle portion, a right angle offset portion, an axis portion, a connecting hook with a tapered insertion end, an attachment eyelet, and a plastic sleeve handle.

U.S. Pat. No. 5,829,798 to Little discloses a fishing knot-tying method and device, comprising a handle end including means for forming loops and a working end including a bifurcated pointed end tapering outwardly toward the handle and including upstanding edges to guide the line and a thumb pad to be used when holding the line.

U.S. Pat. No. 4,660,314 to Janssen et al. discloses a fish hook sneller and line cutter tool for forming a knot from a fishing line on a fish hook and cutting the fishing line is provided and consists of an elongated housing in a size approximating that of a pen/pencil having a sneller mechanism at one end.

U.S. Pat. No. 3,893,254 to Nack describes a fish hook snelling tool comprising a hollow bodied unit enclosing a band power or other resilient element that can be used to provide longitudinal tension and rotational torsion forces, wherein the longitudinal forces of the resilient element hold the fish hook engaged in a vise, and torsional forces of the resilient element provide a winding action to tie snelling knots or ties.

U.S. Pat. No. 3,434,750 to Hetrick describes a finger-held hook snelling device comprising a circular base portion with a center tab for gripping the device. The loop is then twisted and passed over the device to form the snell.

U.S. Pat. No. 2,992,029 to William and U.S. Pat. No. 6,634,680 to Firestone discloses a snelling method and device for fishhooks comprising a flat plate-like key-shaped body.

U.S. Pat. No. 2,700,840 to Butts describes a fish hook snelling device for attaching a snell to a fish hook having a shank portion and an eyelet at one end, a handle portion, means on the handle portion for gripping the shank of the fish hook and, a needle mounted by the said handle portion.

It is apparent now that numerous innovations for snelling fishing hooks have been developed in the prior art that are adequate for various purposes. Even though these innovations may be suitable for the specific purposes to which they address, they would not be suitable for the purposes of the present invention as heretofore described. Thus a method of snelling single strand wire to fishing hooks even without using any special devices is needed. Furthermore, a simple method of the present invention allows a user to snell the fishing hooks quickly and effectively.

SUMMARY OF THE INVENTION

The present invention discloses a method of snelling single strand wire to fishing hooks. With the above-noted prior art and inadequacies in mind, it is an object of the present invention to provide a method of snelling single strand wire to fishing hooks with the help of a needle nose pliers and a linesman pliers. The method uses a wire to snell the fishing hooks. Further the method is simple to use, inexpensive and of assistance in tying knots for either a right or left-handed person.

In accordance with one aspect of the present invention, a method of snelling single strand wire to fishing hooks using a needle nose pliers and a linesman pliers the includes: clutching the wire with the needle nose pliers at a predetermined length from a distal end of the wire; bending the predetermined length of the wire 180 degrees around the needle nose pliers; clutching approximately a center of the predetermined length of the wire from the distal end with the needle nose pliers and bending the distal end 90 degrees keeping the distal and proximal ends of the wires in a horizontal plane to form a "key-like" shaped form of the wire; inserting the distal end of the wire through an eye of the fishing hook; clutching a shank of the hook with the linesman pliers, wherein the distal end of the "key-like" shaped form of the wire is at a 90 degree angle relative to the shank of the hook; and turning the hook counter-clockwise relative to the linesman pliers in a controlled manner for several rotations to create a wire snelled fishing hook.

It is another aspect of the present invention is to provide a method of snelling single strand wire to fishing hooks with the help of a needle nose pliers and a linesman pliers comprising, clutching the wire with the needle nose pliers approximately ¾ inch from the distal end of the wire; bending the wire 180 degrees around the needle nose pliers; clutching the wire with the needle nose pliers approximately ⅜ inch from the distal end of the wire and bending the distal end 90 degrees up keeping the distal and proximal ends of the wires in a horizontal plane to form a "key-like" shaped form of wire; inserting the distal end of the wire through an eye of the fishing hook; clutching a shank of the hook with the linesman pliers, wherein the distal end of the "key-like" shaped form of wire is at 90 degrees relative to the shank of the hook; and turning the hook counter-clockwise relative to the linesman pliers, preferably turning the hook in a controlled manner, so as not to apply enough pressure to break the wire or the hook, preferably up to seven rotations to create a wire snelled fishing hook.

It is another object of the present invention to provide a method of snelling single strand wire to fishing hooks, wherein the wire can be made from iron or steel or galvanized iron or any type of metal to withstand at least a 50 kg load.

It is another object of the present invention to provide a method of snelling single strand wire to a fishing hook by using common and simple tools such as a needle nose pliers or modified needle nose pliers and a linesman or modified linesman pliers.

It is another object of the present invention is to create a desired knot by using a metal wire so as to catch larger fish.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIGS. 1-7. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A method of snelling single strand wire 102 to fishing hooks 108 is described in FIGS. 1-7. The method uses no special device to snell the fishing hooks 108. Further the knot 100 for snelling is created by using metal wires 102 so as to hold larger objects such as big fish or other aquatic animals without breakage or loosening of the knot 100. The method of creating the knot 100 can be done by using common equipment such as a needle nose pliers 104, and a linesman pliers 106. Preferably needle nose pliers and modified linesman pliers can be used. Wherein the method comprises clutching the wire 102 with the needle nose pliers 104 approximately ¾ inch from the distal end of the wire 103 and then bending the wire 180 degrees around the needle nose pliers 104, then clutching the wire 102 with the modified needle nose pliers 108 approximately ⅜ inch from the distal end of the wire 103 and bend the distal end 90 degrees up keeping the distal 103 and proximal ends 105 of the wires 102 in a horizontal plane to form a "key-like" shaped form 112 of wire 102, then inserting the distal end of the wire 103 through an eye 110 of the hook 108, then positioning a hook point 90 degrees relative to the distal end of the wire 103 and then clutching a shank 111 of the hook 108 with the modified linesman pliers 106 and finally turning the hook 108 counter-clockwise relative to the modified linesman pliers 106, preferably turning the hook 108 until there is substantial tension with the wire 102 and then releasing and then turn again, so as not to apply enough pressure to break the wire 102 or the hook 108, preferably up to seven rotations to form the knot 100 so as to create a wire snelled fishing hook 108.

Figure 1:
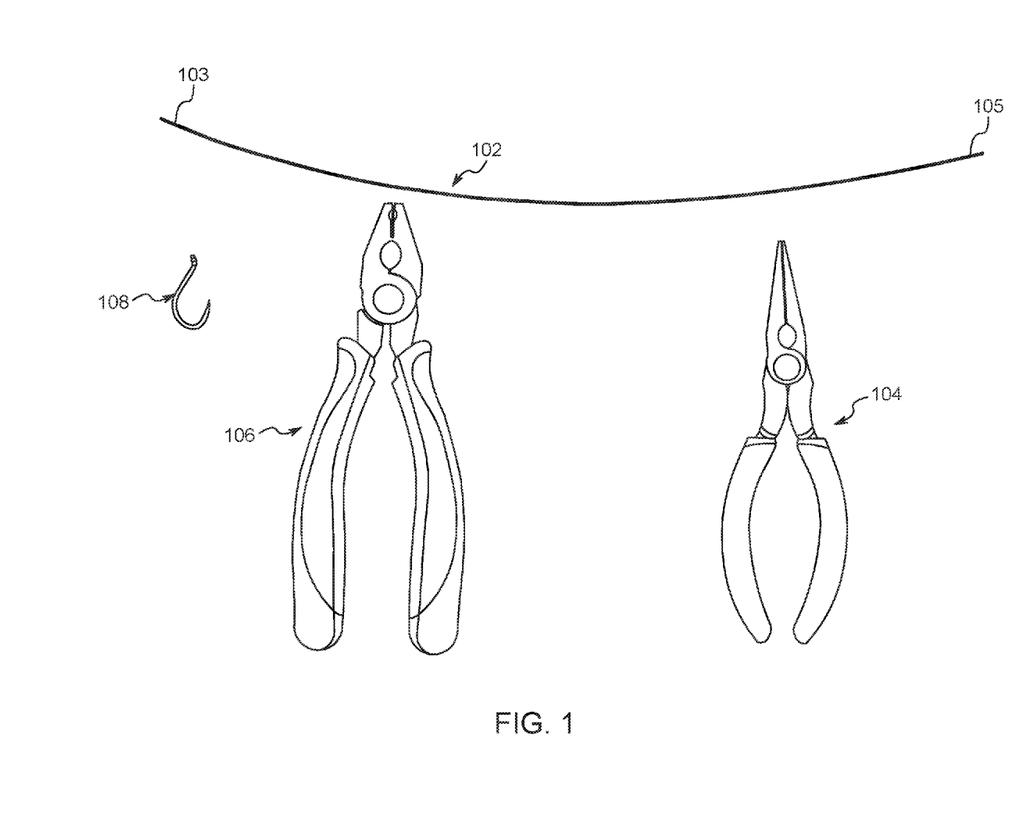
FIG. 1 illustrates an exemplary elements that are required for the method of snelling fishing hooks according to an aspect of the present invention.

As referenced in FIG. 1 which shows a wire 102 having a distal end 103 and a proximal end 105, a needle nose pliers 104, a modified linesman pliers 106 and fishing hook 108. The wire 102 is a single strand wire which is snelled to the fishing hook 108 by use of the simple and common devices like the needle nose pliers 104 and the modified linesman pliers 106. The material of the wire 102 can be of any metal having corrosion resistant property, high elasticity, ductile and having high malleability so that one end 103 of it can be easily bent and turned to form a knot in order to create a wire snelled fishing hook 108. Further the wire 102 has high load bearing capability and durability in aqueous environment, as the wire 102 can be made from aluminum or steel or galvanized iron or copper or any type of metal and having sufficient diameter to withstand at least 50 kg load while enough malleable to be turned to create the desired knot 100.

Figure 2:
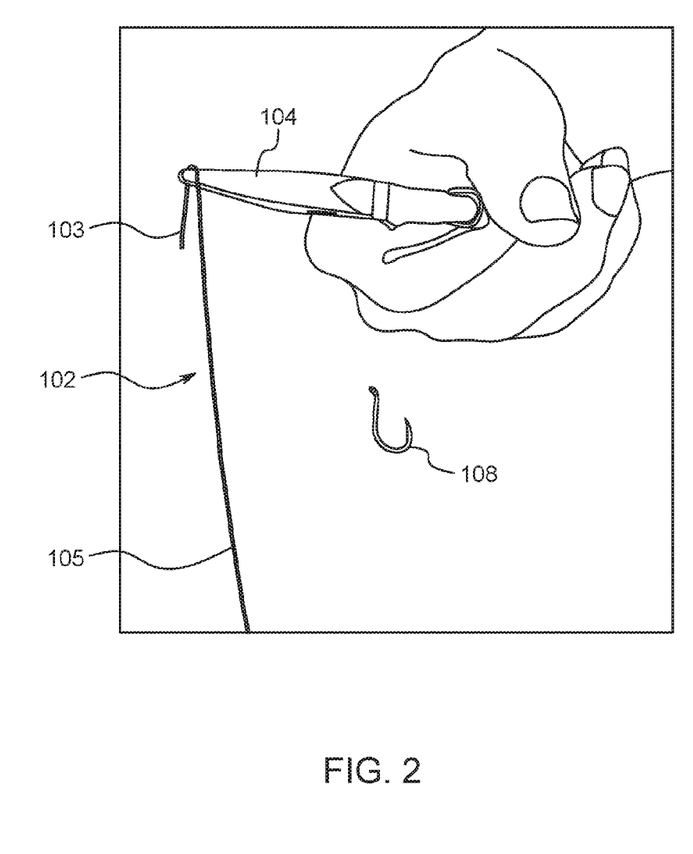
FIG. 2 illustrates an exemplary step of clutching and bending the wire 180 degrees by a needle nose pliers according to an aspect of the present invention.

Turning now to FIG. 2, wherein the FIG. 2 shows the step of clutching and bending the distal end of the wire (103) 180 degrees by a needle nose pliers according to an aspect of the present invention. The wire 102 is clutched at a predetermined length from the distal end of the wire 103 and is bent from that point 180 degrees by the needle nose pliers 104, wherein the predetermined length from the distal end of the wire 103 is ¾ inch from the distal end of the wire 103. The needle nose pliers 104 assists in bending the wire 102 at desired angle and at desired point; however other types of tools, which may solve this purpose, can be used in place of the needle nose pliers 104 without departing from the scope and spirit of the invention.

Figure 3:
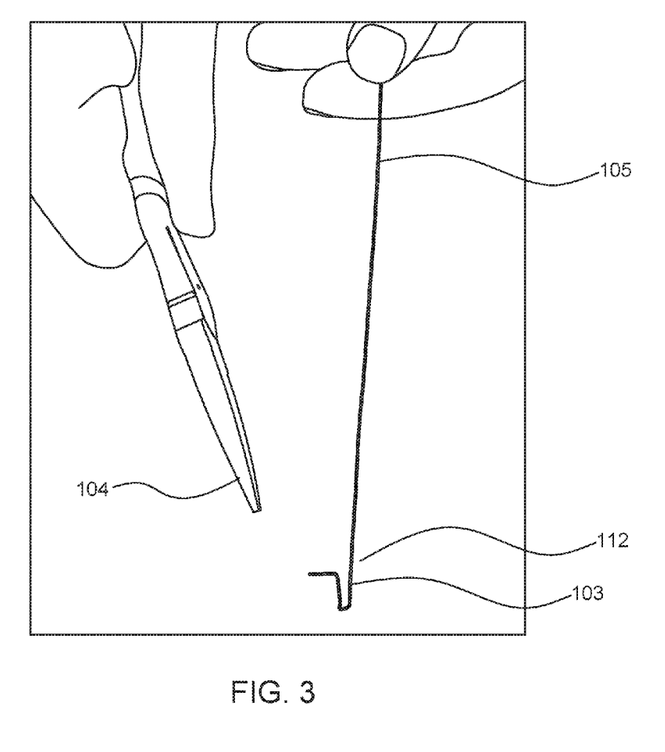
FIG. 3 illustrates an exemplary step of again bending the distal end of the wire 90 degrees to form a "key-like" shaped form of wire according to an aspect of the present invention.

FIG. 3 illustrates an exemplary step of the invention showing clutching the distal end of the wire 103 at a point that is approximately at the center of the predetermined length of the wire from the distal end 103 with the needle nose pliers 104 and bending the distal end (103) 90 degrees up keeping the distal end 103 and proximal end 105 of the wires in a horizontal plane to form a "key-like" shaped form 112 of the wire 102.

Figure 4:
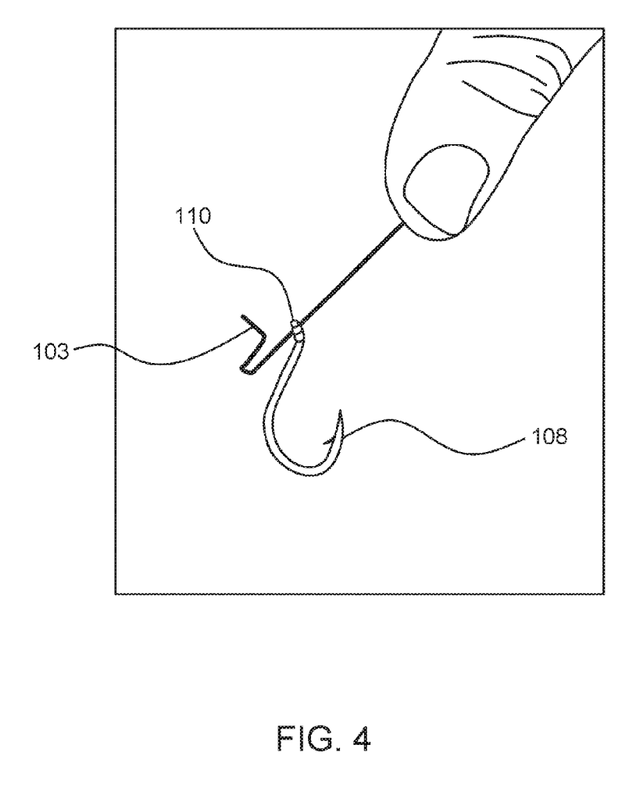
FIG. 4 illustrates an exemplary step showing inserting the distal end of the wire through an eye of the hook according to an aspect of the present invention.

FIG. 4 illustrates an exemplary step showing inserting the distal end of the wire 103 through an eye 110 of the hook 108 according to an aspect of the present invention. Further positioning a hook point 90 degrees relative to the distal end of the wire 103.

Figure 5:
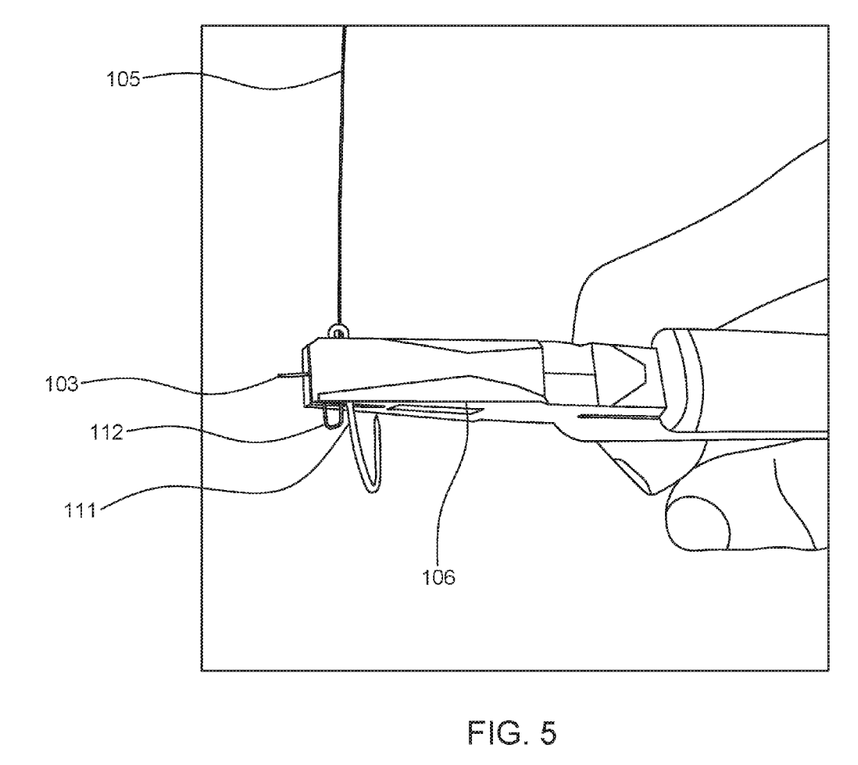
FIG. 5 illustrates an exemplary step showing clutching a shank of the hook with the modified linesman pliers according to an aspect of the present invention.

FIG. 5 illustrates an exemplary step showing clutching a shank 111 of the hook 108 with the linesman pliers 106 according to an aspect of the present invention, wherein the "key-like" shaped form 112 at the distal end of the wire 103 is aligned with the shank 111 of the hook 108. The linesman pliers 106 assists in firm clutching of the wire 102 and the shank 111 of the hook 108 and also assists in turning the wire 102 at a controlled manner, however other types of griping tools, which may solve this purpose can be used in place of the modified linesman pliers 106 without departing from the scope and spirit of the invention.

Figure 6:
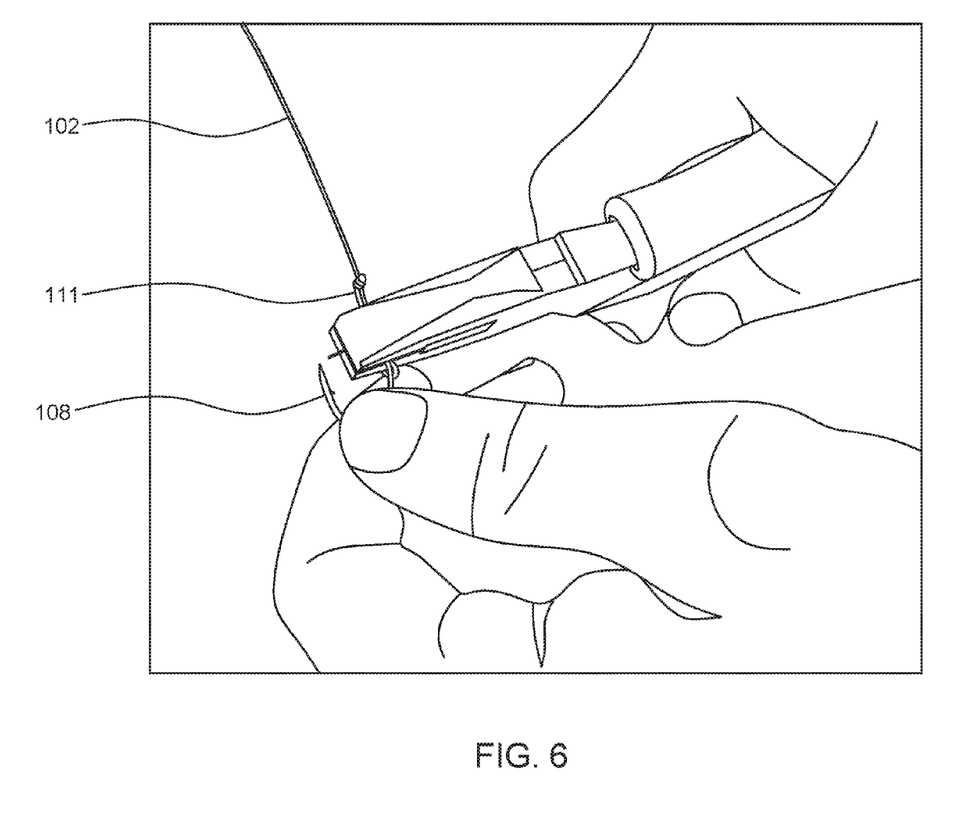
FIG. 6 illustrates an exemplary step showing turning the hook counter-clockwise relative to the modified linesman pliers according to an aspect of the present invention.

FIG. 6 illustrates an exemplary step showing turning the hook counter-clockwise relative to the linesman pliers according to an aspect of the present invention. Wherein the hook 108 is turned counter-clockwise relative to the linesman pliers 106, preferably turning the hook 108 until there is substantial tension with the wire 102 and then releasing and then turn again, so as not to apply enough pressure to break the wire 102 or the hook 108, preferably up to seven rotations to form the knot 100 and thereby creating a wire snelled fishing hook 108. However any number of turns that is sufficient for withstanding the load without failure to form the knot 100 so as to create a wire snelled fishing hook 108 is used without departing from the scope and spirit of the invention.

Figure 7:
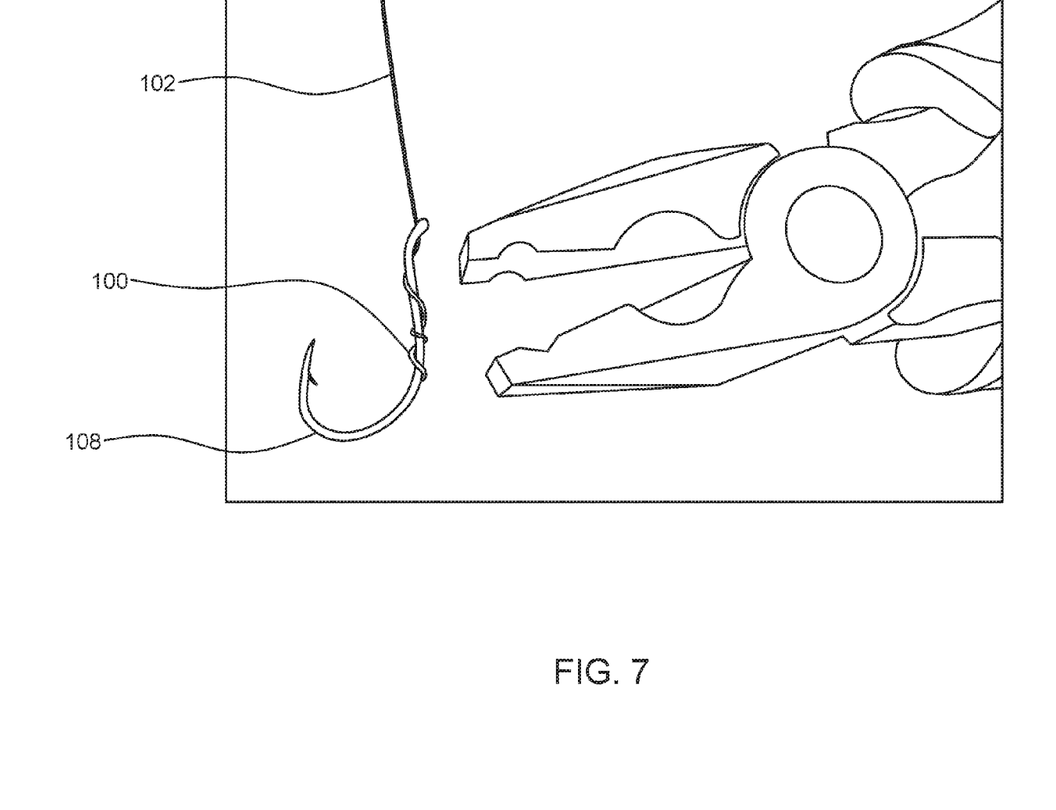
FIG. 7 illustrates an exemplary snelled hook according to an aspect of the present invention.

FIG. 7 illustrates an exemplary snelled hook according to an aspect of the present invention. Turning the hook 108 around the "key-like" shaped form 112 of wire 102 forms the knot 100 in a self-locking spring method for snelling single strand wire 102 to the fishing hooks 108. The knot 100 is tied in a very simple way even without using any specialized devices and is very less time taking. The knot 100 is holding the hook 108 firmly and the proximal end of the wire 105 is extending out of the eye 110 of the hook 108 to act as a fishing line.

In one aspect of the present invention, a method of snelling single strand wire 102 to fishing hooks 108 with the help of a needle nose pliers 104 and a linesman pliers 106 comprising, clutching the wire 102 with the needle nose pliers 104 at a predetermined length from the distal end of the wire 103; bending the predetermined length of the wire 180 degrees around the needle nose pliers 104; clutching approximately at the center of the predetermined length of the wire from the distal end 103 with the needle nose pliers 104 and bending the distal end (103) 90 degrees up keeping the distal and proximal ends of the wires (103 and 105) in a horizontal plane to form a "key-like" shaped form of the wire 112; inserting the distal end of the wire 103 through an eye 110 of the fishing hook 108; clutching a shank 111 of the hook 108 with the linesman pliers 106, wherein the distal end of the "key-like" shaped form 112 of the wire is at 90 degrees relative to the shank 111 of the hook 108; and turning the hook 108 counter-clockwise relative to the linesman pliers 106, preferably turning the hook 108 in a controlled manner for several rotations to create a wire snelled fishing hook 108.

In another aspect, the method is used for snelling single strand wire 102 to fishing hooks 108, wherein the predetermined length of the wire is approximately ¾ inch from the distal end of the wire.

In another aspect, the method is used for snelling single strand wire 102 to fishing hooks 108, wherein the hook is turned in a controlled manner up to seven rotations to create a wire snelled fishing hook.

It is another aspect of the present invention is to provide a method of snelling single strand wire 102 to fishing hooks 108 with the help of a needle nose pliers 104 and a linesman pliers 106 comprising, clutching the wire 102 with the needle nose pliers 104 approximately ¾ inch from the distal end of the wire 103; bending the wire 180 degrees around the needle nose pliers 104; clutching the wire 102 with the needle nose pliers 104 approximately ⅜ inch from the distal end of the wire 103 and bending the distal end 90 degrees up keeping the distal and proximal ends of the wires (103 and 105) in a horizontal plane to form a "key-like" shaped form of wire 112; inserting the distal end of the wire 103 through an eye 110 of the fishing hook 108; clutching a shank 111 of the hook 108 with the linesman pliers 106, wherein the distal end 103 of the "key-like" shaped form of wire 112 is at 90 degrees relative to the shank 111 of the hook 108; and turning the hook 108 counter-clockwise relative to the linesman pliers 106, preferably turning the hook 108 in a controlled manner, so as not to apply enough pressure to break the wire 102 or the hook 108, preferably up to seven rotations to create a wire snelled fishing hook 108.

In another aspect, the of snelling single strand wire 102 to fishing hooks 108, wherein the wire 102 is made of iron or steel or galvanized iron or any type of metal to support at least 50 kg load.

In another aspect, the method is used for snelling single strand wire 102 to fishing hooks 108 by using common and simple tools such as a modified needle nose pliers 104 and a modified linesman pliers 106.

In another aspect, the method is used for snelling single strand wire 102 to fishing hooks 108, wherein the controlled turning of the hook 108 comprises turning the hook 108 until there is substantial tension with the wire 102 and then releasing and then turned again, so as not to apply enough pressure to break the wire 102 or the hook 108.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A method of snelling single strand wire to fishing hooks using a needle nose pliers and a linesman pliers comprising:
    clutching the wire with the needle nose pliers at a predetermined length from a distal end of the wire;
    bending the predetermined length of the wire 180 degrees around the needle nose pliers;
    clutching approximately a center of the predetermined length of the wire from the distal end with the needle nose pliers and bending the distal end 90 degrees keeping the distal and proximal ends of the wires in a horizontal plane to form a "key-like" shaped form of the wire;
    inserting the distal end of the wire through an eye of the fishing hook;
    clutching a shank of the hook with the linesman pliers, wherein the distal end of the "key-like" shaped form of the wire is at a 90 degree angle relative to the shank of the hook; and
    turning the hook counter-clockwise relative to the linesman pliers in a controlled manner for several rotations to create a wire snelled fishing hook.

2. The method of claim 1, wherein the predetermined length of the wire is approximately ¾ inch from the distal end of the wire.

3. The method of claim 1, wherein the controlled turning of the hook comprises turning the hook until there is tension with the wire and then releasing and then again, so as not to apply enough pressure to break the wire or the hook.

4. The method of claim 1, wherein the hook is turned in a controlled manner up to seven rotations to create a wire snelled fishing hook.

5. The method of claim 1, wherein the wire is made of a material capable of supporting at least a 50 kg load.

6. The method of claim 1 wherein the wire is made of iron, steel, or galvanized iron.

7. The method of claim 1 where in the linesman pliers are modified linesman pliers.

8. A method of snelling single strand wire to fishing hooks using a needle nose pliers and a linesman pliers comprising:
    clutching the wire with the needle nose pliers approximately ¾ inch from the distal end of the wire;
    bending the wire 180 degrees around the needle nose pliers;
    clutching the wire with the needle nose pliers approximately ⅜ inch from the distal end of the wire and bending the distal end 90 degrees up keeping the distal and proximal ends of the wires in a horizontal plane to form a "key-like" shaped form of wire;
    inserting the distal end of the wire through an eye of the fishing hook;
    clutching a shank of the hook with the linesman pliers, wherein the distal end of the "key-like" shaped form of wire is at 90 degrees relative to the shank of the hook; and
    turning the hook counter-clockwise relative to the linesman pliers in a controlled manner, so as not to apply enough pressure to break the wire or the hook to create a wire snelled fishing hook.

9. The method of claim 8 wherein the hook is turned up to seven rotations.

10. The method of claim 9, wherein the wire is capable of supporting at least a 50 kg load.

11. The method of claim 9, wherein the wire is made of iron, steel, galvanized iron, or copper.

12. The method of claim 9, wherein the controlled turning of the hook comprises turning the hook until there is tension with the wire and then releasing and turning again, so as not to apply enough pressure to break the wire or the hook.

* * * * *